United States Patent [19]

Ruben et al.

[11] 4,358,956
[45] * Nov. 16, 1982

[54] LIQUID LEVEL INDICATOR

[75] Inventors: Samuel Ruben, New Rochelle, N.Y.; Philip E. Kalker, Damarest, N.J.

[73] Assignee: Emdee Corporation, Northvale, N.J.

[*] Notice: The portion of the term of this patent subsequent to Oct. 14, 1997, has been disclaimed.

[21] Appl. No.: 130,936

[22] Filed: Mar. 17, 1980

Related U.S. Application Data

[63] Continuation-in-part of Ser. No. 29,967, Apr. 13, 1979, Pat. No. 4,207,766, which is a continuation-in-part of Ser. No. 824,046, Aug. 12, 1977, Pat. No. 4,227,410.

[51] Int. Cl.³ .......................... G01F 23/14; G01L 4/04; H01C 1/08
[52] U.S. Cl. ........................................ 73/301; 73/725; 338/42
[58] Field of Search ............... 73/301, 719, 308, 313, 73/296, 725; 338/40, 41, 42, 99; 324/146

[56] References Cited

U.S. PATENT DOCUMENTS

| | | | |
|---|---|---|---|
| 1,285,145 | 11/1918 | Harrington et al. | 73/301 |
| 1,705,158 | 3/1929 | McCoy | 324/146 |
| 2,004,421 | 6/1935 | Smulski | 73/312 |
| 2,286,717 | 6/1942 | Clason | 73/301 X |
| 2,333,406 | 11/1943 | Ballard | 73/313 |
| 2,339,021 | 1/1944 | Lingel | 324/125 |
| 2,375,178 | 5/1945 | Ruben | 338/52 |
| 2,651,015 | 9/1953 | Meredith | 73/179 |
| 2,883,623 | 4/1959 | Hastings et al. | 324/146 |
| 2,932,807 | 4/1960 | Bourns | 73/719 |
| 2,985,019 | 5/1961 | Calvin | 73/719 |
| 3,013,233 | 12/1961 | Bourns | 338/40 |
| 3,013,234 | 12/1961 | Bourns | 338/40 |
| 3,013,236 | 12/1961 | Bourns | 73/719 |
| 3,030,598 | 4/1962 | Cerny et al. | 338/41 |
| 3,045,492 | 7/1962 | Kutzler | 73/719 |
| 3,196,324 | 7/1965 | Stuetzer | 338/41 |
| 3,247,716 | 4/1966 | Ranke | 73/734 |
| 3,271,720 | 9/1966 | Hluchan et al. | 338/42 |
| 3,286,523 | 11/1966 | Barrows et al. | 73/725 X |
| 3,301,047 | 1/1967 | Von Wald, Jr. et al. | 338/42 X |
| 3,513,701 | 5/1970 | Soltanoff | 73/301 |
| 3,630,087 | 2/1971 | Ogden et al. | 73/736 |
| 3,638,481 | 2/1972 | Wilner | 73/301 X |
| 3,640,134 | 2/1972 | Hop | 73/299 |
| 4,207,766 | 6/1980 | Ruben et al. | 73/301 |
| 4,227,410 | 10/1980 | Ruben et al. | 73/301 |

FOREIGN PATENT DOCUMENTS

| | | | |
|---|---|---|---|
| 559149 | 7/1942 | United Kingdom | 73/301 |
| 573257 | 11/1945 | United Kingdom | 73/301 |

Primary Examiner—Daniel M. Yasich
Attorney, Agent, or Firm—David A. Jackson

[57] ABSTRACT

An indicator for measuring the liquid content of a container comprises a sensor disposed within the container. The sensor comprises a resistor disposed within a housing and in communication with a movable wall thereof, the movable wall located near the lower end of the housing. The housing resides in proximity with the bottom wall of the container and registers with the external ambient through an opening provided in one wall thereof.

19 Claims, 3 Drawing Figures

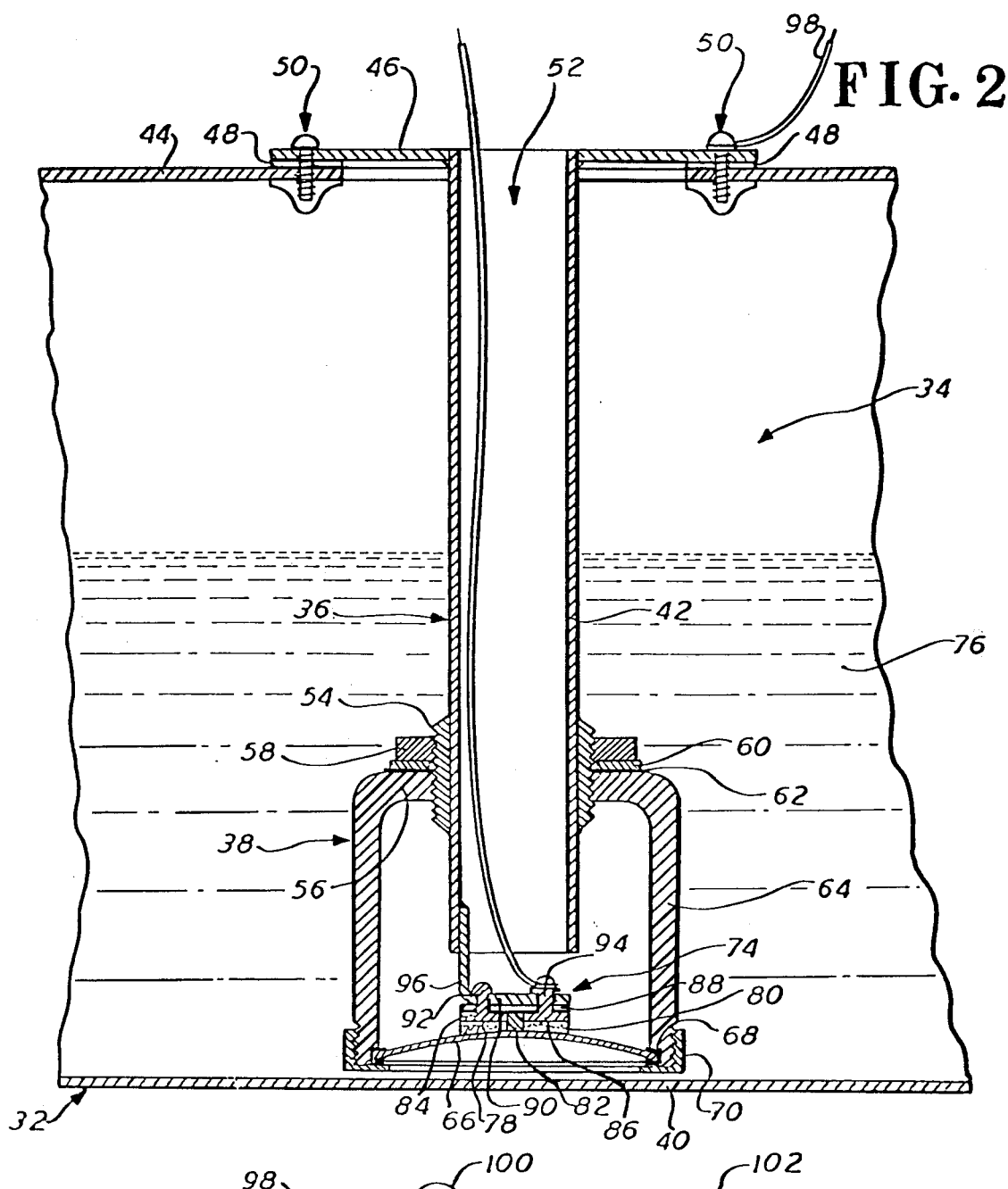
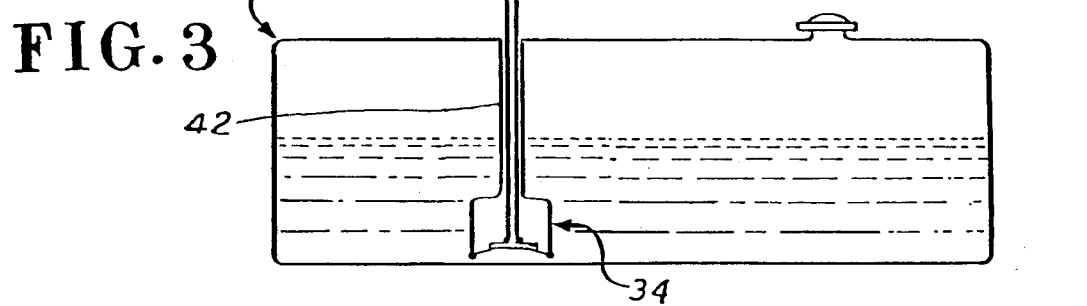

LIQUID LEVEL INDICATOR

CROSS-REFERENCE TO RELATED APPLICATIONS

The present application is a continuation-in-part application of copending application Ser. No. 29,967, filed Apr. 13, 1979, now U.S. Pat. No. 4,207,766, which in turn, is a continuation-in-part application of application Ser. No. 824,046, now U.S. Pat. No. 4,227,410 filed Aug. 12, 1977, by the inventors herein.

BACKGROUND OF THE INVENTION

This invention relates to indicating apparatus and particularly to electrically operated indicating apparatus responsive to changes in electric current.

The use of electrically responsive indicating apparatus to measure certain physical conditions, such as temperature, pressure and liquid level is well known. Further, many of the indicating apparatus have employed devices which measure the change in the particular physical state as a function of electrical resistance, with the results of the measurement appropriately displayed on an ammeter. Indicator assemblies employing the measurement of resistance are found in U.S. Pat. No. 1,285,145 to Harrington et al., U.S. Pat. No. 1,705,158 to McCoy, U.S. Pat. No. 2,004,421 to Smulski, U.S. Pat. No. 2,333,406 to Ballard, U.S. Pat. No. 2,339,021 to Lingel, U.S. Pat. No. 2,883,623 to Hastings et al., U.S. Pat. No. 2,985,019 to Colvin, U.S. Pat. Nos. 3,013,233 and 3,013,234 to Bourns, U.S. Pat. No. 3,247,716 to Ranke, U.S. Pat. No. 3,630,087 to Ogden et al., U.S. Pat. No. 3,638,481 to Wilner, and U.S. Pat. No. 3,640,134 to Hop.

The majority of the above-listed patents are generally related to the measurement of a physical state as a function of resistance. Certain of the patents, including the patents to Bourns, Ranke and Colvin, attempt to measure differences in pressure to arrive at a pressure ratio by the employment of paired resistance elements or transducers appropriately linked. Ogden et al. and Hop attempt to balance separate pressure readings to arrive at a mean value.

The prior art represented above also disclosed a wide variety of transducer elements, ranging from the coiled structures known as Bourdon tubes, and including bellows-type resistors, piezoresistive elements, as well as simple mechanical linkage between a float member and a rheostat arm. All of the indicator assemblies discussed above possess certain deficiencies in that they are in most instances complicated devices that are costly to manufacture and maintain, or in the alternative are simple devices less expensive to manufacture however inaccurate in performance.

A need has long existed for an accurate indicator assembly to monitor, for example, a level of liquid fuel in a container such as a fuel tank, steam boiler or the like, which is subject to motion in use. Specifically, in the instance of marine vessels and aircraft, the fuel tanks are necessarily subjected to constant changes in attitude from the horizontal which renders the accurate metering of the fuel level extremely difficult. Attempts to adapt the transducers shown in the prior art have resulted in complicated, cumbersome assemblies which were generally unreliable and costly. Thus, for example, the device disclosed in the patent to Hop comprises a particularly complex assembly attempting to derive accurate measurement through a measurement of pressure differentials at various points in the fluid container, which pressure differentials are then fed into a summing and dividing circuit which is designed to arrive at a mean value. A need thus exists for a simple, space-saving and accurate indicator assembly.

In our copending application Ser. No. 824,046, the disclosure of which is incorporated herein by reference, an indicator assembly capable of attitude correction is disclosed which employs a pair of weight-responsive variable resistors disposed in fluid connection at the opposite ends of the bottom of a fluid container, and electrically connected to each other in series, to provide a liquid measurement in terms of a total resistance output which will be constant for a given volume of liquid. The device thus described is simple in construction and operation and is easily employed by direct series connection to an electric current-responsive meter, such as an ammeter or the like. Liquid level measurement is accomplished by the use of weight-responsive devices such as Bourdon tubes and aneroid bellows, which are mechanically linked to identical rheostats.

SUMMARY OF THE INVENTION

In accordance with the present invention, an indicator is dislosed for measuring the liquid content of a container, which comprises a sensor comprising a variable resistor assembly disposed within the container and adjacent its bottom. The resistor assembly comprises a resistor supported within a housing and in communication with a movable wall near its lower end. The housing also defines a passageway which makes contact with the external ambient air by connection to an opening provided in a wall of the container.

In one embodiment, the resistor employed in the invention may be of the compression-type, and the housing is in registry with an opening located in the top wall of the container.

The sensor is directly electrically connected to an electric current-responsive meter which is calibrated to indicate liquid content. Electric power may be provided to the indicator assembly by connection to an appropriate voltage supply, such as a storage battery or the like. The exact construction of the current-responsive meter useful in the present indicator may vary, and, in one embodiment, may include a meter adapted to compensate for variations in the output of the voltage supply.

Accordingly, it is a principal object of the present invention to provide a liquid content indicator for use with a liquid container which provides stable level indication at all levels of liquid content.

It is a further object of the present invention to provide a liquid content indicator as aforesaid which provides constant level indication unaffected by changes in the attitude of the container.

It is a yet further object of the present invention to provide a liquid content indicator as aforesaid wherein said liquid content is measured as a function of electrical resistance.

It is a yet further object of the present invention to provide a liquid content indicator as aforesaid which is of simple, unobtrusive construction and installation and offers consistent accuracy in operation.

Other objects and advantages will become apparent to those skilled in the art from a review of the ensuing description which proceeds with reference to the following accompanying drawings.

BRIEF DESCRIPTION OF THE DRAWINGS

FIG. 2 is a fragmentary side sectional view illustrating a specific resistor construction comprising an alternate embodiment of the present invention.

FIG. 3 is a schematic side sectional view illustrating the sensing assembly of FIG. 2 electrically connected and located in a liquid container.

DETAILED DESCRIPTION OF THE INVENTION

Figure 1:
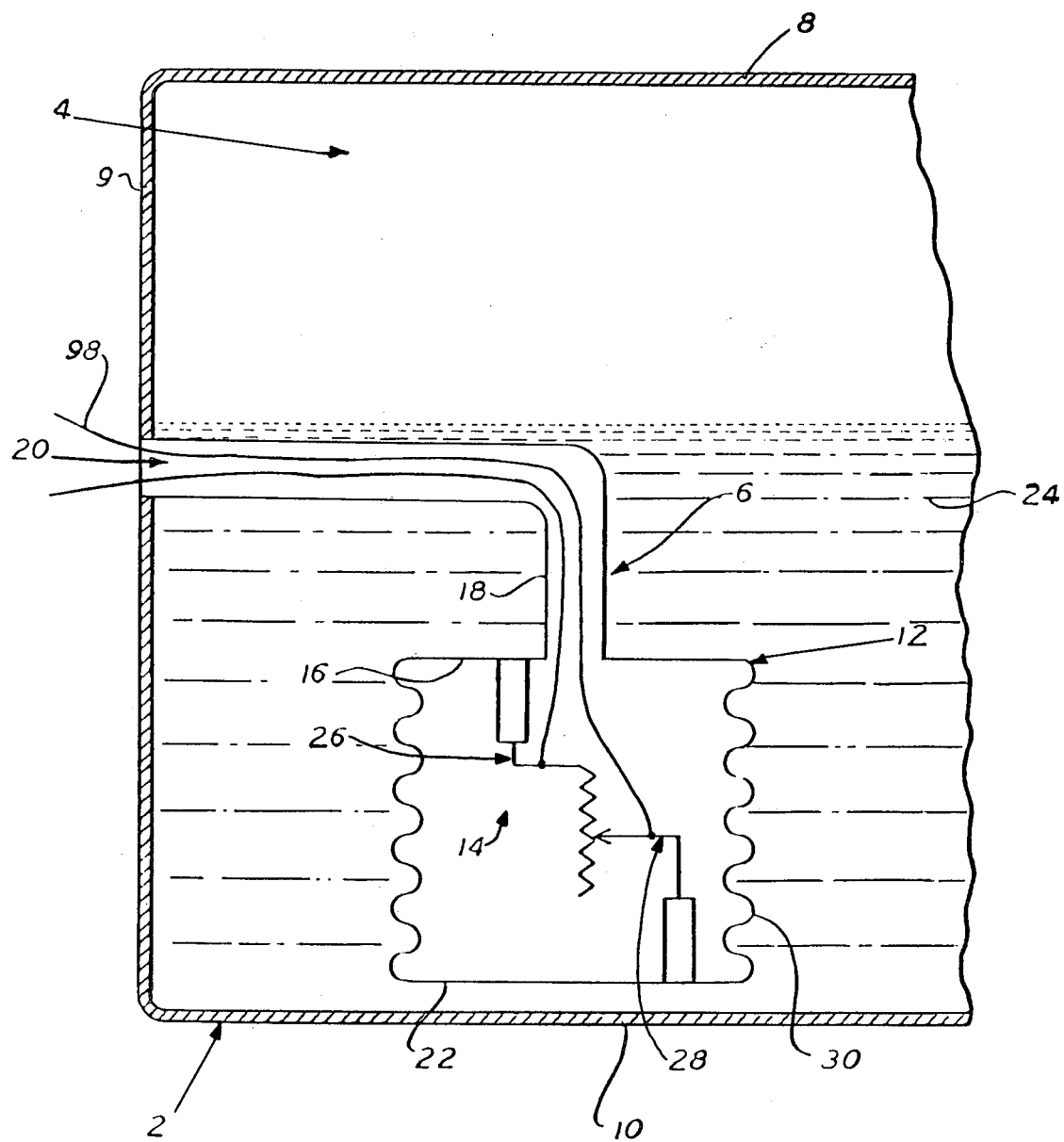
FIG. 1 is a fragmentary schematic side sectional view illustrating a resistor comprising one embodiment of the present invention.

The indicator of the present invention comprises a sensor comprising a variable resistor assembly disposed within a liquid container adjacent its bottom. Referring to FIG. 1, a liquid container 2 is illustrated in fragmentary schematic fashion fitted with a variable resistor assembly 4 which comprises part of the sensor of the present invention.

Resistor assembly 4 comprises a housing 6 mounted within container 2 by fluid-tight attachment to side wall 9. Housing 6 extends from side wall 9 into proximity with bottom wall 10 of container 2, where it defines a chamber 12 which provides support for a weight responsive, variable resistor 14. Chamber 12 comprises an upper wall 16 which is connected to a neck 18 which extends into fluid-tight contact with wall 9. Neck 18 provides an air passageway which mates with an axially aligned opening 20 provided in side wall 9 and thereby places the interior of housing 6 in fluid contact with the ambient atmosphere outside container 2.

The placement of the internal environment of housing 6 in registry with the external ambient serves, among other things, to allow resistor 14 to compensate itself for any changes of atmospheric pressure exerted upon the contained liquid that may take place. This particular feature is especially valuable in the instance where the indicator of the present invention is installed in the fuel tank of an airplane.

The present invention includes the provision of housing 6 in fluid-tight connection with any of the walls of container 2, so long as the above functions of support and contact of housing 6 with the external ambient are possible. The construction shown in FIG. 1 is therefore intended to be illustrative of one embodiment, as a second embodiment is shown in FIG. 2, to be discussed in detail later on.

In accordance with the present invention, housing 6 comprises at least one movable wall responsive to changes in liquid weight, and situated in communication with the weight responsive variable resistor mounted therein. Referring further to FIG. 1, housing 6 defines a movable wall communicating with variable resistor 14, comprising lower wall 22, which is situated in substantial alignment with bottom 10 of container 2. As noted, lower wall 22 is adapted to move in response to the changes in the weight of said liquid occurring as a function of variations of liquid level. Thus, for example, an increase in the level of liquid 24 exerts greater weight and pressure against lower wall 22 which forces lower wall 22 upward and toward upper wall 16. In the illustration of FIG. 1, variable resistor 14 is schematically depicted and comprises a conventional wire wound resistance element 26 along which a sliding conductor 28 is designed to travel. Thus, when lower wall 22 moves toward upper wall 16, conductor 28 moves along element 26 to cause a decrease in the resistance, and a correspondence increase in the current output issuing from variable resistor 14.

In the embodiment illustrated in FIG. 1, the movement of lower wall 22 is facilitated by the provision of movable side wall 30, which is adapted for lateral movement. Side wall 30 is preferably prepared from a flexible, resilient material and may, as illustrated, assume a bellows-type configuration to accommodate the movement of lower wall 22.

Resistor 14 is shown in FIG. 1 as mounted between upper wall 16 and lower wall 22, whereby the movement of lower wall 22 causes a change in the resistance output. Upper wall 16 remains stationary, as does neck 18, and therefore the resistor 14 is preferably mounted adjacent these stationary structures, in addition to its contact with the movable wall, to facilitate the occurrence of the changes in resistance. Thus, as will be noted with reference to FIG. 2, below, the resistor of the present invention may be mounted in attachment to the neck, as well as the upper wall of the housing. In this regard, the internal diameter of neck 18 is not critical, however, neck 18 may have a diameter less than that of chamber 12.

The sensor of the present invention may be constructed from a variety of materials sufficiently resistant to pressure and inert to the liquid environment, particularly in the instance where the liquid is a hydrocarbon fuel. Thus, the housing, including the neck and the stationary portions of the chamber may be constructed from a wide variety of pressure and corrosion resistant metals, such as stainless steel and the like. The portions of the chamber requiring resilience and flexibility may be constructed from materials selected from the group consisting of thin gauge metals exhibiting acceptable bend strength, such as beryllium-copper alloys, employed in thicknesses of up to about two mils; certain resinous materials comprising silicon polymers including polysiloxanes; and certain organic resinous materials including polyolefins such as polyethylene and polypropylene. Further discussion of materials useful in accordance with the construction of the present invention will proceed with reference to specific embodiments later on.

The preceding discussion has dealt generally with one construction of a resistor assembly useful with the present invention, and the following description will relate to a resistor assembly somewhat variant therewith.

Referring now to FIG. 2, a resistor assembly in accordance with a further embodiment of the present invention employs a variable resistor known as a "compression type" resistor. The compression type resistor functions by the variation of contact resistance between materials which have negative pressure resistance coefficients or which function by the compression of a mixture of powder or flake of a conductive material with an insulating material, whereby compression, in effect, increases the electrical pathways provided by the resistor mixture. A particular resistor functioning as a "compression type" resistor useful in accordance with the present invention is disclosed in U.S. Pat. No. 2,375,178 to Ruben, the disclosure of which is incorporated herein by reference. The resistor material disclosed in Ruben comprises a fibrous inorganic mat such as a glass mat or the like which has been impregnated with a resistor material, such as colloidal graphite, platinum, nickel or the like, after which the impregnated mat is heated to bond the resistor material firmly thereto. The exact resistance values exhibited by the resulting resistor material can be controlled by varying the amount of impregnant employed. Further details respecting the process and operation of the resistor of Ruben will not be enumerated herein as they are not believed material to the present invention, and the artisan is accordingly referred to the patent therefor.

Referring now to FIG. 2, a liquid container 32 is fragmentarily illustrated and a variable resistor assembly 34 is shown disposed therein. Resistor assembly 34, like resistor assembly 4 in FIG. 1, comprises a housing 36, a chamber 38 disposed adjacent the bottom wall 40 of container 32, and a neck 42 attached to chamber 38. In this embodiment, neck 42 extends upwardly and into contact with top wall 44 of container 32. Neck 42 is further modified by the addition thereto of a mounting plate 46, which may be detachably mounted to top wall 44 as illustrated, by the use of an appropriate fluid-tight gasket 48 and bulkhead-screw assembly 50. Thus, neck 42 cooperates with mounting plate 46 to define an opening 52 which permits the air passageway defined by neck 42 to register with the ambient atmosphere lying outside container 32, as set forth in the discussion of FIG. 1, above. The construction of neck 42 simplifies the installation of resistor assembly 34, as container 32 need only be provided with a hole having a diameter slightly greater than the diameter of chamber 38. Appropriate attachment holes may then be drilled and the bulkhead fittings affixed thereto, so that resistor assembly and appropriate gasket 48 need only be lowered into position and firmly fastened by the attachment of the screws as shown.

Referring further to FIG. 2, neck 42 is illustrated as detachably attached to chamber 38 by the provision of a threaded collar annularly disposed about neck 42, which is adapted to engage complementary threads provided within an opening defined in upper wall 56. Chamber 38 is locked into position by the provision of a lock nut 58 and interstitial washer 60 and gasket 62 which assure the maintenance of a fluid-tight connection.

In the embodiment of FIG. 2, both upper wall 56 and side wall 64 of chamber 38 are stationary. Side wall 64 is preferably cylindrical and thus defines a circular opening for the reception of a movable lower wall 66. The inside edge of side wall 64 is chamfered at its lower end to define a circumferential ledge 68. The outside edge of side wall 64 just annularly displaced from ledge 68 is threaded to receive a circular internally threaded lock nut 70 which cooperates with ledge 68 to retain the peripheral edge of lower wall 66. Additionally, a circumferential gasket 72 may be provided to embrace the peripheral edge of lower wall 66 to assure a fluid-tight seal between lower wall 66 and side wall 64. Though the foregoing construction is illustrated and described, it is to be understood that the present invention is not limited thereto but includes other constructions accomplishing the same purpose of providing a fluid-tight connection between respective walls.

Referring further to FIG. 2, resistor assembly 34 is provided with a weight-responsive, variable resistor 74 mounted within chamber 38 in communication with movable lower wall 66. Resistor 74 is compression responsive, and lower wall 66 is prepared from a flexible material capable of oscillatory movement to exert compressive force on resistor 74 to cause a variation in its current output. Lower wall 66 is disposed in generally parallel relation to bottom wall 40, and moves in response to force imposed by the weight of contained liquid 76. Resistor 74 is fixedly mounted within chamber 38 by attachment to an extension of neck 42, adjacent upper wall 56. The provision of neck 42 in this construction simplifies the assembly of resistor 74, as well as that of chamber 38, as described earlier.

As noted earlier, resistor 74 is a compression type resistor which employs at least one mat of resistive material impregnated glass fibers prepared in accordance with the '178 patent. In the present illustration, resistor 74 comprises paired mats 78 and 80 which are disposed in electrically insulated coplanar relation to each other and in contact with lower wall 66. Mats 78 and 80 are separated along their adjacent peripheral edges by the provision of a flexible insulator strip 82 and are mounted respectively, on individual support plates 84 and 86, which are likewise disposed in electrically insulated coplanar relation. Electrical insulation is provided by insulator strip 82 which extends between the peripheral edges of plates 84 and 86, and an appropriate insulator sheet 88 which extends over the upper surfaces of both support plates. Support plates 84 and 86 are in turn attached to a base plate 90 which, as illustrated, is likewise electrically conductive. Support plates 84 and 86 are thus provided with rod-like attachment pegs or screws 92 and 94, which are adapted to seat within appropriate holes provided in base plate 90. As shown in FIG. 2, support plate 86 is electrically insulated from base plate 90 by the provision of a continuation of insulator sheet 88 into the opening provided in base plate 90 for the reception of attachment screw 94.

Base plate 90 comprises an essentially planar structure which further includes resistor mounting means 96, comprising a bracket-like extension disposed in perpendicular relation to base plate 90 for attachment to neck 42 in any conventional manner such as that illustrated herein.

In operation, resistor assembly 34 is surrounded with liquid 76 which impinges on lower wall 66 and causes lower wall 66 to deflect in the direction of resistor 74. In this embodiment, lower wall 66 completes the circuit between mats 78 and 80 and therefore is prepared from an electrically conductive material, such as beryllium-copper alloys, conductive organic resins and the like. As noted earlier, in the instance where a beryllium-copper alloy is employed, the thickness of lower wall 66 is preferably between about 1.5 and 2 mils. Further, it is preferably in accordance with the present invention that the motion of the glass fibers contained in mats 78 and 80 be damped somewhat by the impregnation of the mats with a viscid dielectric fluid such as machine oil, mineral oil and the like. In this manner, the resistance output of resistor 74 is more uniform.

Referring now to FIG. 3, the indicator of the present invention is illustrated schematically in its entirety. Thus, container 32 is illustrated provided with a sensor comprising variable resistor assembly 34 located within the container.

Electric current issuing from resistor assembly 34 travels directly to an electric current responsive meter 100 which is adapted to register and depict the liquid content as a function of the total resistance developed by resistor assembly 34. As noted in our copending application, the selection of a particular electric current responsive meter is not critical, as the sensor of the present invention provides a constant total resistance output to the meter at a particular liquid level. Thus, any meter capable of being appropriately calibrated to convert variations in electrical resistance into corresponding liquid levels is operable.

In accordance with a particular embodiment, meter 100 may include means for compensating its readings for variations in the output of the voltage source. Such a meter structure is well known in the art and is illustrated in U.S. Pat. No. 2,004,421 to Smulski, the disclosure of which is incorporated herein by reference. The Smulski meter includes paired coils so arranged as to place the voltage source, comprising a battery, in parallel relation to one coil thereof.

The indicator of the present invention further includes a source of voltage, which may be of either alternating or direct current, and in a preferred embodiment illustrated herein, may comprise direct current derived from a storage battery, such as batter 102 schematically represented in FIG. 3.

The attitude compensating sensor of the pesent invention is so disposed within the liquid container that, as the liquid content is reduced, the total current output of the resistor assembly will decrease proportionately so that the meter will accurately reflect the change in liquid content of the container. Also, the provision of the passageway and the registry of the resistor assembly with the external ambient atmosphere enables the present indicator to automatically adjust for changes in atmospheric pressure, such as may be encountered in the instance where the indicator of the present invention is installed in a fuel tank employed in aircraft.

The indicator of the present invention finds wide utility and, particularly, is suited for installation in such liquid containers as fuel tanks for automobiles and aircraft, and the steam boilers of ships, which are all subject to motion and frequent variation in attitude.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. An indicator for measuring the liquid content of a container comprising a variable resistor assembly, said resistor comprising:
   A. a housing mounted within said container attached to one wall thereof and extending into proximity with the bottom of said container,
   B. said housing comprising a chamber located near the bottom of said container and an elongated neck extending from said chamber into fluid tight attachment with said container wall for communicating with the ambient atmosphere outside said container,
   C. said chamber comprising an upper wall attached to said elongated neck, and a movable lower wall spaced from and located in substantial alignment with the bottom of said container, said lower wall adapted to move in response to the changes in liquid weight resulting from corresponding changes in said liquid content, and
   D. a weight responsive variable resistor sensor means mounted within said chamber in communication with said movable lower wall, one end of said resistor sensor means connected to said upper wall and the other end of said resistor sensor means connected to said movable wall,
   wherein the movement of said movable lower wall will cause a change in the electric current output of said resistor that will accurately reflect a particular level of liquid content.

2. The indicator of claim 1 wherein said housing is attached to the top wall of said container.

3. The indicator of claim 1 wherein said neck defines an air passageway and said container wall defines an opening aligned with said passageway, whereby said housing is in fluid contact with the ambient atmosphere outside said container.

4. The indicator of claim 3 wherein said electrical series connection comprises at least one connecting wire which travels through said passageways.

5. The indicator of claim 3 wherein the diameter of said neck is less than the diameter of said chamber.

6. The indicator of claim 1 wherein said lower wall is prepared from a flexible material and is mounted for movement in an oscillatory manner.

7. The indicator of claim 1 wherein said variable resistor is wire wound and comprises a resistance element and a sliding contact conductor electrically connected thereto.

8. The indicator of claim 1 wherein said variable resistor comprises a compression-type resistor.

9. The indicator of claim 1 further comprising an electric current responsive meter directly electrically connected to said sensor and adapted to depict said liquid content as a function of the resistance developed by said resistor, and a source of voltage electrically connected to said sensor and said meter to supply electric current for the operation of said indicator.

10. The indicator of claim 9 wherein said meter includes means for compensating the depiction of said liquid content for variations in the output of said voltage source.

11. The indicator of claim 9 wherein said voltage source comprises a storage battery providing direct current.

12. The indicator of claim 1 wherein said resistor comprises a compression-type resistor and said lower wall is electrically conductive.

13. The indicator of claim 12 wherein said resistor comprises at least one resistance element, said resistance element comprising at least one compressible glass fiber mat having a coating of a resistor material permanently bonded thereto, said resistor material selected from the group consisting of colloidal graphite, platinum and nickel.

14. The indicator of claim 13 wherein said resistor comprises paired mats disposed in coplanar relation in contact with said lower wall, said mats peripherally separated by a flexible electrical insulator, wherein electrical current passes through said resistor by traveling between said mats across said lower wall.

15. The indicator of claim 14 wherein said lower wall is prepared from a flexible material and is mounted for movement in an oscillatory manner.

16. The indicator of claim 15 wherein said flexible material comprises a conductive resinous material.

17. The indicator of claim 14 wherein each of said mats is attached to a corresponding support plate, said support plates are electrically insulated from each other and disposed in coplanar relation, and a unitary base plate is provided which is adapted to retain support plates and includes means for mounting said resistor adjacent said upper wall of said chamber.

18. The indicator of claim 17 wherein said base plate, and said support plates are electrically conductive, and said base plate is electrically connected to one of said support plates, and electrically insulated from the other.

19. The indicator of claim 1 further comprising a movable side wall prepared from a flexible material, said side wall adapted for lateral movement in response to the movement of said lower wall.

* * * * *